May 19, 1964 W. S. BUTLER ETAL 3,133,628
SHAKER CONVEYOR TROUGH LINE
Filed Dec. 24, 1962

INVENTORS
William S. Butler
Paul J. Fontaine
BY
ATTYS.

United States Patent Office 3,133,628
Patented May 19, 1964

3,133,628
SHAKER CONVEYOR TROUGH LINE
William S. Butler, Clarendon Hills, and Paul J. Fontaine, Chicago, Ill., assignors to Goodman Manufacturing Company, Chicago, Ill., a corporation of Illinois
Filed Dec. 24, 1962, Ser. No. 246,814
5 Claims. (Cl. 198—220)

This invention relates to improvements in shaker conveyor trough lines adapted to be used for industrial purposes to transport heavy abrasive materials.

A principal object of the invention is to provide a novel and improved shaker conveyor trough line adapted to convey abrasive materials, such as, scale, castings, foundry sand and the like, in which the stresses of reciprocable movement of the trough line are taken on an underlying trough extending for the length of the trough line and in which renewable liner troughs for the underlying trough carry the abrasive materials.

Another object of the invention is to provide an improved form of shaker conveyor trough line for carrying abrasive materials in which the drive for the trough line is to an underlying trough extending for substantially the length of the trough line, and in which renewable liner troughs are clamped to the underlying trough at one of the ends of the liner troughs and are free to expand and contract at the opposite ends of the liner troughs.

A further object of the invention is to provide an improved form of shaker conveyor trough section for conveying abrasive materials, which may be relatively hot, in which liner troughs are secured at one of their ends to a reciprocably driven underlying trough, to accommodate longitudinal expansion and contraction of the liner troughs with respect to each other, and in which spacer means are provided to space the bottoms of the liner troughs above the bottom of the underlying trough, to provide an insulating air space between the troughs.

A still further object of the invention is to provide a simplified and improved connecting means for renewably connecting a series of cascading liner troughs to an underlying drive trough of a shaker conveyor trough line.

These and other objects of the invention will appear from time to time as the following specification proceeds and with reference to the accompanying drawings wherein.

Figure 1:
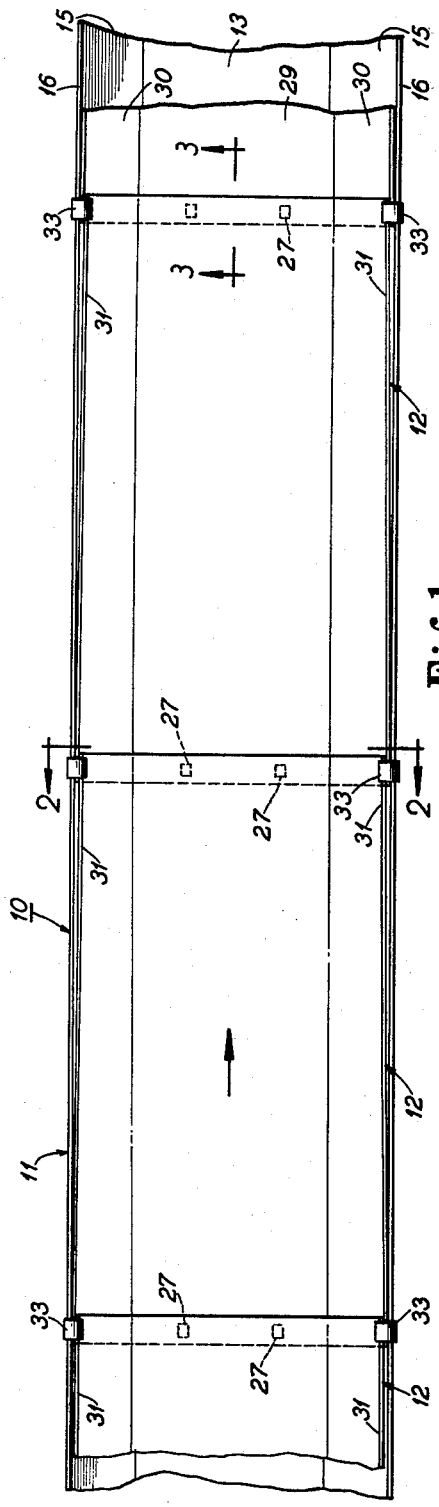
FIGURE 1 is a fragmentary top plan view of a shaker conveyor trough line constructed in accordance with the principles of the present invention.

In the embodiment of the invention illustrated in the drawing, we have shown in FIGURE 1 a portion of a shaker conveyor pan or trough line indicated generally by reference character 10. The trough line 10 includes an underlying trough 11, which may extend for the length of the trough line and take the impact forces of the shaker conveyor. A plurality of liner pans or troughs 12, 12 are also shown as being mounted within the underlying trough 11 and connected thereto to one end thereof, as will hereinafter be more fully described as this specification proceeds.

The underlying trough 11 may be reciprocably driven by a conventional shaker conveyor drive mechanism (not shown) to effect the movement of material along the trough line in the direction of the arrow shown in FIGURE 1 and has a relatively flat bottom 13 having inclined side walls 15, 15 flaring outwardly and upwardly from opposite sides of said bottom and terminating into parallel upright connector flanges 16, 16.

Figure 2:
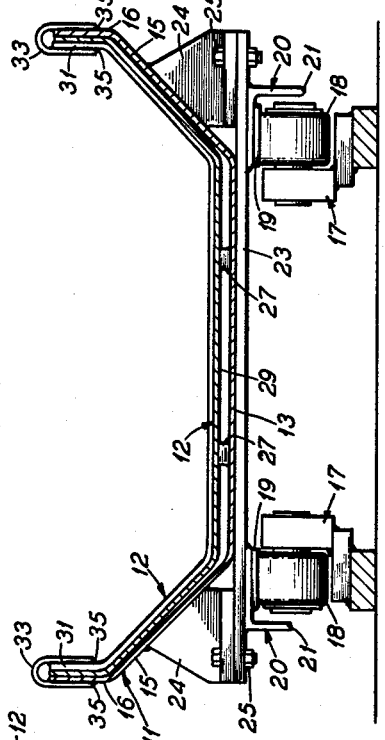
FIGURE 2 is a transverse sectional view taken substantially along line 2—2 of FIGURE 1.

The underlying trough 11 is mounted on a series of spaced roller supports 17, 17. The roller supports 17 are spaced at suitable intervals along the underlying trough 11 and include rollers 18, 18 mounted for rotatable movement about horizontal axes, and engaged by wear strips 19, 19 extending along the bottoms of angle retainers 20, 20. The angle retainers 20, 20 have vertical legs 21 spaced outwardly of the rollers 18 and serve to retain the underlying trough 11 to said rollers. The angle retainers 20 extend along the bottom of a cross plate 23 supporting the underlying trough 11, and extending across and along the bottom of said trough for a portion of the length thereof. As shown in FIGURE 2, angle brackets 24 have engagement with the inclined side walls 15 of the underlying trough 11, on their vertical legs, and are welded or otherwise secured thereto. The horizontal legs of the angle brackets 24 abut the top surface of the cross plate 23, and are shown as being bolted thereto, as by nuts and bolts 25.

The underlying trough 11 also has a plurality of spacer lugs 27, 27 projecting upwardly from the bottom thereof and forming a support for bottoms 29 of the receiving end portions of the overlapped liner troughs 12. The spacer lugs 27 are shown as being at the overlapping joints between the liner troughs and provide air space between the underlying trough 11 and the liner troughs 12 to dissipate the heat of the liner troughs 12, and to prevent the heat of said liner troughs from unduly heating the underlying trough 11, when the conveyor is conveying hot material, such as hot castings and the like.

Each liner trough 12 has outwardly flaring side walls 30, 30 flaring outwardly from the bottom 29, and generally conforming to the flared side walls 15, 15 of the under trough 11. The flared side walls 30, 30 terminate at their upper ends into upright flanges 31, 31, generally conforming to the flanges 16, 16 and forming connector flanges for the liner troughs 12. The liner troughs 12 also slightly converge from their receiving to their discharge ends to accommodate the discharge end of one trough to be nested within the receiving end of the next adjacent trough.

A connecting means is provided between the flanges 16, 16 of the underlying trough 11 and the flanges 31, 31 of the overlapping liner troughs 12, which is so arranged as to eliminate all weakening bolt holes in the connection between the troughs, and to allow longitudinally expansible and contractible movement of the liner troughs, to accommodate ready expansion and contraction of said troughs, as hot castings, foundry sand or scale are deposited thereon.

Figure 3:
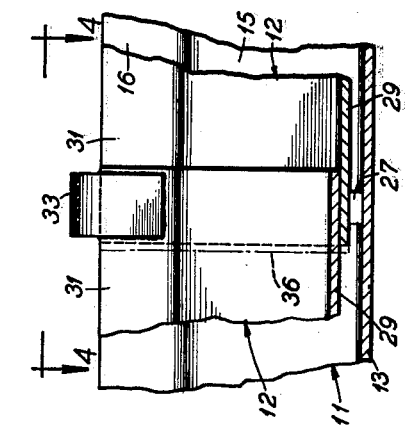
FIGURE 3 is an enlarged fragmentary longitudinal sectional view taken substantially along line 3—3 of FIGURE 1.
Figure 4:
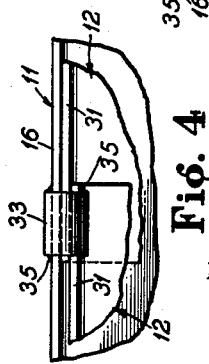
FIGURE 4 is a fragmentary plan view looking at the trough line substantially along line 4—4 of FIGURE 3 and showing the connecting means for one side of one of the liner troughs to the underlying trough of the trough line.

The clamping means, as herein shown, comprises a series of downwardly facing U-shaped clips 33 extending over the tops of the connector flanges 16 and 31 and downwardly along said flanges. As shown in FIGURES 2 and 4, the clips 33 extend downwardly along the outer sides of the flanges 16 of the underlying trough and downwardly along the inner sides of the flanges 31 of the nested or overlapping trough and having no connection with the adjacent end of the underlapped trough. This accommodates longitudinal expansion and contraction of the underlapped trough with respect to the overlapped trough, the expansion of the underlapped trough being generally indicated by dashed lines 36 in FIGURE 3. The clips 33 may be secured to the associated connector flanges 16 and 31 as by welding, indicated by reference characters 35 in FIGURES 2 and 4.

While the clips 33 are shown as being welded to the connector flanges 16 and 31, said clips need not necessarily be welded to said connector flanges but may be clamped thereto by suitable clamping means (not shown), if desired. The welded clips, however, provide simplified connectors and may readily be burned from the connector flanges, when it becomes necessary to replace the liner troughs.

The liner troughs, therefore, are connected to the underlying trough along their flanged upper edges and the connection from the underlying trough to the associated liner troughs is at one end only of the liner troughs to accommodate longitudinal expansion and contraction of the liner troughs with respect to each other, without buckling or distorting the troughs.

It may also be seen that the underlying trough takes all of the stresses of reciprocable movement of the conveyor and the air space between the liner troughs and the underlying trough tends to dissipate the heat of the liner troughs and to save the load carrying underlying trough from extreme temperature changes and to thereby make it possible to provide an underlying trough carrying the load of the conveyor, which will have a relatively long life, and to provide shorter lived liner troughs, which may readily be replaced when worn by the abrasive material carried thereby.

While we have herein shown and described one form in which our invention may be embodied, it may readily be understood that various modifications and variations in the invention may be attained without departing from the spirit and scope of the novel concepts thereof.

We claim as our invention:

1. In a shaker conveyor trough line, an underlying trough extending for the length of the trough line, a plurality of liner troughs extending along said underlying trough and nested therein, each liner trough having a discharge end overlapping the receiving end of the next adjacent liner trough, and means securing the overlapping discharge end portion of each liner trough to said underlying trough and accommodating expansible and retractible movement of said liner troughs with respect to each other.

2. A shaker conveyor trough line in accordance with claim 1, wherein said underlying trough has spacers projecting upwardly from the bottom thereof, and supporting said liner troughs above the bottom of said underlying trough to provide an air space therebetween.

3. A shaker conveyor trough line in accordance with claim 1 wherein the securing means for the liner troughs to the underlying trough includes clips extending over the tops of said troughs and having engagement with the outside of the underlying trough and the inside of the lapping end portions of the liner troughs and welded thereto.

4. A shaker conveyor trough line comprising a reciprocably supported underlying trough extending for substantially the length of the trough line and having a flat bottom, outwardly flared side walls and connector flanges extending upwardly from said side walls, a plurality of liner troughs extending along and within said underlying trough and having flat bottoms, outwardly flared side walls and connector flanges extending upwardly from said side walls, each liner trough tapering toward its discharge end and the discharge end thereof overlapping the receiving end of the next succeeding liner trough, and means securing the overlapping discharge end portions of the liner troughs to the underlying trough comprising clips at the overlapping joints between said troughs of a generally U-shaped downwardly opening formation and engaging the connecting flanges of the underlying trough and the connector flanges of the liner trough at the overlapping end portions thereof, and means welding said clips to said connector flanges of said underlying and liner troughs.

5. A conveyor trough line in accordance with claim 4 wherein spacer lugs project upwardly from the the bottom of said underlying trough and have engagement with the bottom of the underlapped trough at the nested joint between said troughs, and spacing said liner trough above the bottom of said underlying trough to provide an air circulating and insulating space between said troughs.

No references cited.